(12) United States Patent
Davies (10) Patent No.: US 9,194,410 B2
(45) Date of Patent: Nov. 24, 2015

(54) NUTLESS BOLT

(75) Inventor: Brian T. Davies, Esperance (AU)

(73) Assignee: BRIAN INVESTMENTS PTY LTD, Rivervale (AU)

( * ) Notice: Subject to any disclaimer, the term of this patent is extended or adjusted under 35 U.S.C. 154(b) by 0 days.

(21) Appl. No.: 14/113,023

(22) PCT Filed: Apr. 20, 2012

(86) PCT No.: PCT/AU2012/000418
§ 371 (c)(1),
(2), (4) Date: Dec. 26, 2013

(87) PCT Pub. No.: WO2012/142673
PCT Pub. Date: Oct. 26, 2012

(65) Prior Publication Data
US 2014/0133932 A1    May 15, 2014

(30) Foreign Application Priority Data

Apr. 20, 2011 (AU) ................................ 2011901479
Apr. 28, 2011 (AU) ................................ 2011901560

(51) Int. Cl.
*F16B 21/00*     (2006.01)
*F16B 15/04*     (2006.01)
(Continued)

(52) U.S. Cl.
CPC ............... *F16B 15/04* (2013.01); *F16B 19/109* (2013.01); *F16B 21/165* (2013.01)

(58) Field of Classification Search
CPC .......... F16B 2/16; F16B 21/165; F16B 15/04; F16B 19/109; F16B 21/00; F16D 1/116
USPC ................. 411/21–22, 348; 403/322.1, 322.2
See application file for complete search history.

(56) References Cited

U.S. PATENT DOCUMENTS 1,926,798 A    9/1933    Baumbach
2,901,804 A *  9/1959    Williams ...................... 411/348
(Continued)

FOREIGN PATENT DOCUMENTS

DE    3701074    7/1988
EP    0450820    10/1991
(Continued)

OTHER PUBLICATIONS

International Search Report issued for PCT/AU2012/000418 mailed Jun. 7, 2012.
(Continued)

*Primary Examiner* — Roberta Delisle
(74) *Attorney, Agent, or Firm* — RatnerPrestia (57) ABSTRACT

A nutless bolt includes a body having a shaft and a stop coupled to the shaft. Shaft is dimensioned to allow passage through a hole formed in a structure into which the bolt is inserted. The stop prevents body from falling into or through the hole. An axial bore formed in body houses a locking mechanism extending radially from shaft to lock body and nutless bolt in the hole. An actuator pin movable along the bore in a generally down hole direction through various positions. Position L1 is a pre-application position; position L2 is a locking position; and position L3 is a release position. Pin is movable in the down hole direction from L2 where the pin causes the locking mechanism to extend radially from shaft to lock the body in the hole, to L3 where the pin is retained in the body and displaced relative to the locking mechanism.

55 Claims, 2 Drawing Sheets

(51) Int. Cl.
 *F16B 21/16* (2006.01)
 *F16B 19/10* (2006.01)

(56) References Cited

U.S. PATENT DOCUMENTS

| | | | | |
|---|---|---|---|---|
| 2,904,787 | A * | 9/1959 | De Caro | 227/10 |
| 3,117,484 | A * | 1/1964 | Myers | 411/348 |
| 3,138,393 | A * | 6/1964 | Livingston | 285/277 |
| 3,682,506 | A * | 8/1972 | Bruyere et al. | 403/299 |
| 4,453,449 | A * | 6/1984 | Hollmann | 89/1.806 |
| 4,507,034 | A * | 3/1985 | Lew et al. | 411/21 |
| 5,207,544 | A | 5/1993 | Yamamoto | |
| 5,303,908 | A | 4/1994 | Halder | |
| 5,452,979 | A | 9/1995 | Cosenza | |
| 6,331,091 | B2 * | 12/2001 | Cross | 403/322.2 |
| 6,386,789 | B1 | 5/2002 | Chausse et al. | |
| 8,549,724 | B2 * | 10/2013 | Davies | 29/525.01 |
| 8,821,061 | B2 | 9/2014 | Baus | 403/322.2 |
| 2009/0064488 | A1 * | 3/2009 | Davies | 29/700 |
| 2009/0110477 | A1 * | 4/2009 | Seger | 403/376 |

FOREIGN PATENT DOCUMENTS

| | | |
|---|---|---|
| EP | 0563542 | 10/1993 |
| EP | 1205672 | 5/2002 |
| FR | 2415225 | 8/1979 |
| GB | 2204654 | 11/1988 |
| NZ | 506394 | 10/2000 |
| WO | 9512762 | 5/1995 |
| WO | WO 2006/108245 A1 | 10/2006 |

OTHER PUBLICATIONS

International Preliminary Report on Patentability issued for PCT/AU2012/000418 dated Mar. 5, 2013.

Entire patent prosecution history of U.S. Appl. No. 11/911,646, filed, Aug. 28, 2008, entitled, "Fastener," now U.S. Pat. No. 8,549,724, issued Oct. 8, 2013.

* cited by examiner

NUTLESS BOLT

This application is the U.S. National Phase Application of PCT/AU2012/000418, filed Apr. 20, 2012, which claims priority to Australian Patent Application Nos. 2011901479, filed Apr. 20, 2011 and 2011901560, filed Apr. 28, 2011, the contents of such applications being incorporated by reference herein.

FIELD OF THE INVENTION

The present invention relates to a nutless bolt.

BACKGROUND OF THE INVENTION

Applicant has made many innovations in the area of fasteners, particularly for fastening wear plates to a structure. An example of one such fastener is described in International publication no. WO 2006/108245. The fastener described in the aforementioned publication is a nutless bolt which is inserted into a hole from one side of a surface and is applied or fixed in place by attaching an application tool to a head of the bolt and driving a pin into a bore formed centrally through the head and a shank of the bolt. The shaft is provided with a number of radially extending channels each of which provides a race for a corresponding ball. When the pin is driven in a down hole direction into the shaft it forces the balls to move radially along their respective channels so as to protrude partially from the channels beyond an outer circumferential surface of the shaft. This prevents the fastener from being removed in a direction opposite to the direction of insertion and in effect locks the fastener in place. To remove the fastener, the pin is pushed further in the down hole direction and falls from the shaft. This enables the balls to roll in a radially inward direction so as to lie within the outer circumferential surface of the shaft. Thus the fastener can now be removed from the hole. The ability to remove the fastener from the hole characterises the fastener as a bolt. This is to be contrasted from rivets which can only be removed by destroying the rivet itself.

SUMMARY OF THE INVENTION

In one aspect of the invention there is provided a nutless bolt comprising:
  a body having a shaft capable of insertion in to a hole and a stop coupled to the body, the stop configured to stop the body falling wholly into or through the hole, the shaft being provided with an axially extending bore;
  a locking mechanism disposed in the shaft and operable to extend radially from the shaft to lock the body in the hole; and,
  an actuating mechanism disposed in the shaft and being movable axially in the bore in a down hole direction from a locking position where the actuating mechanism causes the locking mechanism to extend radially from the shaft to lock the body in the hole, to a release position down hole of the locking position where the actuating mechanism is retained in the body and displaced relative to the locking mechanism to a location enabling the locking mechanism to retract radially into the shaft and the bolt to be withdrawn.

In a second aspect of the invention there is provided a nutless bold comprising:
  a body having a shaft capable of insertion in to a hole and a stop coupled to the body, the stop configured to stop the body falling wholly into or through the hole, the shaft being provided with an axially extending bore;
  a locking mechanism disposed in the shaft and operable to extend radially from the shaft to lock the body in the hole; and,
  an actuating mechanism disposed in the shaft and being movable axially in the bore in a down hole direction from a preapplied position in which the actuating mechanism does not cause the locking mechanism to extend radially from the shaft, to a locking position where the actuating mechanism causes the locking mechanism to extend radially from the shaft to lock the body in the hole, and subsequently to a release position down hole of the locking position where the actuating mechanism is retained in the body and displaced relative to the locking mechanism to a location enabling the locking mechanism to retract radially into the shaft and the bolt to be withdrawn.

In a third aspect of the invention there is provided a nutless bolt comprising:
  a body having a shaft capable of insertion in to a hole and a stop coupled to the body, the stop configured to stop the body falling wholly into or through the hole, the shaft being provided with an axially extending bore the shaft having an up hole end and a down hole end and wherein the bore is open at the up hole end;
  a locking mechanism disposed in the shaft and operable to extend radially from the shaft to lock the body in the hole; and,
  an actuating mechanism configured to enable it to be inserted into the bore from the open up hole and to be moved axially in the bore in a down hole direction from a locking position where the actuating mechanism causes the locking mechanism to extend radially from the shaft to lock the body in the hole, to a release position down hole of the locking position where the actuating mechanism is retained in the body and displaced relative to the locking mechanism to a location enabling the locking mechanism to retract radially into the shaft and the bolt to be withdrawn.

In a fourth aspect of the invention there is provided a nutless bolt comprising:
  a body having a shaft capable of insertion in to a hole and a stop coupled to the body, the stop configured to stop the body falling wholly into or through the hole, the shaft being provided with an axially extending bore;
  a locking mechanism disposed in the shaft and operable to extend radially from the shaft to lock the body in the hole; and,
  an actuating mechanism disposed in the shaft and having an up hole end and a down hole end, the actuating mechanism being movable axially in the bore in a down hole direction from a locking position where the actuating mechanism causes the locking mechanism to extend radially from the shaft to lock the body in the hole, to a release position down hole of the locking position where the actuating mechanism is retained in the body and the up hole end of the activating mechanism is advanced past the locking mechanism to a location enabling the locking mechanism to retract radially into the shaft and the bolt to be withdrawn.

In some embodiments the bore is configured to prevent the actuating mechanism from falling from the body when moved to the release position.

In some embodiments bore comprises a blind hole which is closed at a down hole end of the shaft and open at an up hole end of the shaft.

In some embodiments the bore is provided at a down hole end of the shaft with an opening of a diameter less than a maximum outer diameter of the actuating mechanism wherein a portion of the actuating mechanism can protrude from the down hole end of the shaft when the locking mechanism is in the release position. In these embodiments the bolt may comprise a frangible seal formed across the opening at the down hole end of the shaft wherein when the actuating mechanism is moved to the release position, a portion of the actuating mechanism ruptures the frangible seal.

In some embodiments the bolt comprises a resilient O-ring retained in the stop. In such embodiments the stop may be provided with a circumferential groove which seats the O-ring.

In some embodiments the stop is provided with an outer circumferential surface having opposite first and second axial ends wherein the first axial end is located closest the hole when the fastener is inserted into the hole, and wherein the first axial end has a smaller diameter than the second axial end.

In some embodiments the outer circumferential surface of the stop is generally tapered at a first angle between the first and second axial ends.

In some embodiments the bolt comprises a head engagable with the body.

In some embodiments the body is provided with a threaded portion adjacent the stop.

In some embodiments the bolt comprises a head threadingly engagable with the threaded portion of the body.

In some embodiments the head is provided with a through hole positioned to align axially with the bore in the shaft.

In some embodiments the head is provided with an outer circumferential surface which tapers at the first angle.

In some embodiments the head is formed of a harder wearing material than the body.

In some embodiments the bolt comprises a quantity of grease or like material disposed in the shaft in a region between a down hole end of the shaft and the locking mechanism.

In some embodiments the shaft comprises a plurality of radially extending channels, each channel opening into the bore and onto an outer circumferential surface of the body and configured to allow a portion of the locking mechanism to protrude beyond the outer surface of the shaft when the actuating mechanism is in the locking position.

In some embodiments the locking mechanism comprises a plurality of balls.

In some embodiments the bolt comprises a sleeve disposed about the body at a location where when the actuating mechanism is in the locked position the locking mechanism is retained between the actuating mechanism and the sleeve and is disposed partly within and partly outside of the body.

In some embodiments the sleeve has an undeformed state where the sleeve has an outer surface of constant outer diameter and retains the locking mechanism in the body prior to the actuating mechanism being moved to the locking position; and an expanded state where the sleeve is expanded radially outwards by the locking mechanism when the actuating mechanism is moved to the locking position.

In some embodiments the sleeve is configured such that a portion of the sleeve extends into the hole into which the shaft is inserted, and a portion of the sleeve extends from the hole.

In some embodiments the shank comprises a first portion adjacent the stop of a first outer diameter, and a second portion contiguous with the first portion having a stepped reduction in outer diameter relative to the first portion, and wherein the shank and the sleeve are relatively configured so that when the sleeve is provided over the second portion of the shank, an outer diameter of the sleeve adjacent the first portion of the shank is essentially equal to the outer diameter of the first portion of the shank.

DETAILED DESCRIPTION OF PREFERRED EMBODIMENTS

FIGS. 1 to 4 illustrates an embodiment of a nutless bolt 10 in accordance with the present invention fastening a wear plate 12 to a structure 14. Nutless bolt 10 comprises a body 16 having a shaft 18 and a stop 20 coupled to the shaft 18. Body 16 is shown most clearly in FIG. 4. Shaft 18 is dimensioned to allow it to pass through a hole 22 formed in structure 14 while stop 20 is configured to stop or prevent body 16 from falling wholly into or through the hole 22. An axial bore 24 is formed in body 16 and houses a locking mechanism 26 which is operable to extend radially from shaft 18 to lock the body 16 and nutless bolt 10 in the hole 22. An actuating mechanism in the form of pin 28 is disposed in bore 24. Pin 28 is movable along the bore 24 in a generally down hole direction. In the context of this specification and claims the expression "down hole direction" corresponds with the direction of insertion of bolt 10 into hole 22. Thus, with reference to FIG. 1, the down hole direction indicated by the arrow D is toward the right hand side of the page.

Figures 1, 2:
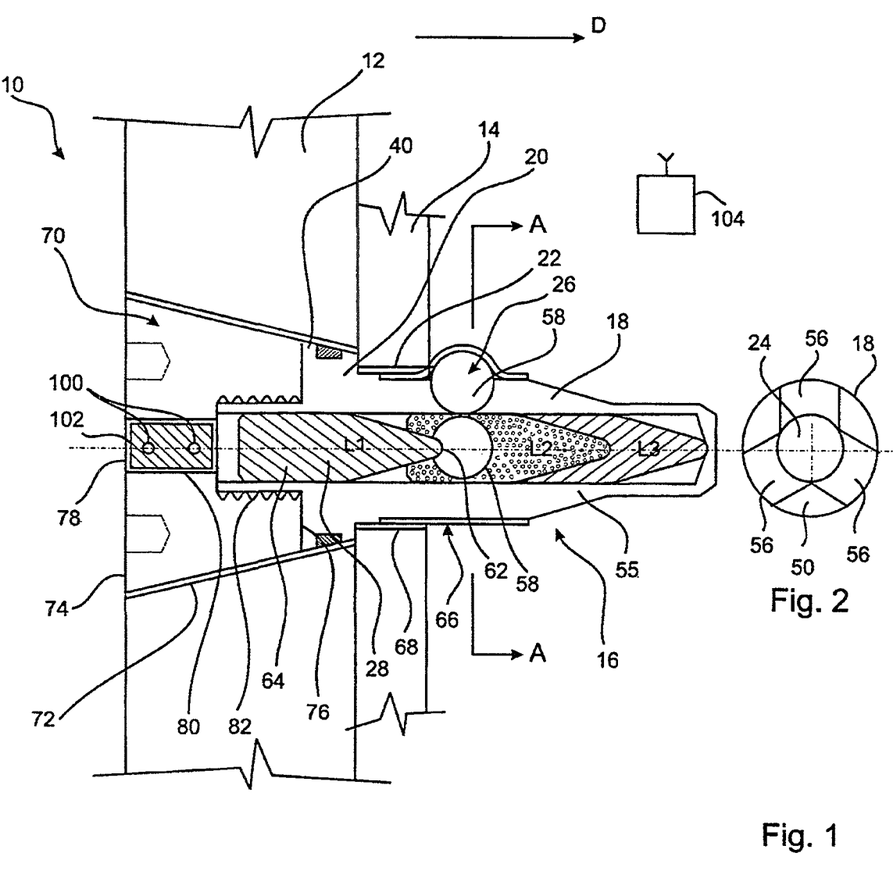
FIG. 1 is a schematic representation of an embodiment of a nutless bolt in accordance with the present invention in use fastening a wear plate to a structure.
FIG. 2 is a view of section AA of bolt shown in FIG. 1.
Figure 3:
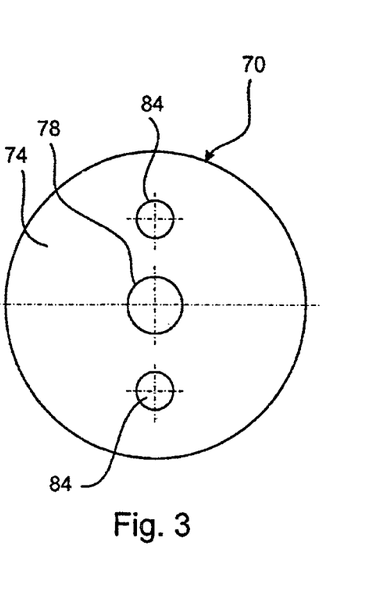
FIG. 3 is a end elevation of the bolt shown in FIG. 1.

FIG. 1 illustrates pin 28 in three axially spaced positions designated as L1, L2 and L3. To further assist in distinguishing the different locations, the pin when at position L1 is depicted with cross hatching in a first direction; when in position L2 is depicted with a stippled effect; and when in position L3 is designated with cross hatching in an opposite direction to that shown in position L1. Position L1 of pin 28 may be considered as a pre-application position; the position L2 is a locking position; and position L3 is a release position. As explained in greater detail below, pin 28 is movable in the down hole direction from the locking position L2 where the pin causes the locking mechanism 26 to extend radially from shaft 18 to lock the body 16 in the hole 22, to the release position L3 where the pin 28 is retained in the body 16 and displaced relative to the locking mechanism 26. This allows locking mechanism 26 to retract radially into shaft 18 and in turn enables the fastener 10 to be withdrawn from hole 22.

Figure 4:
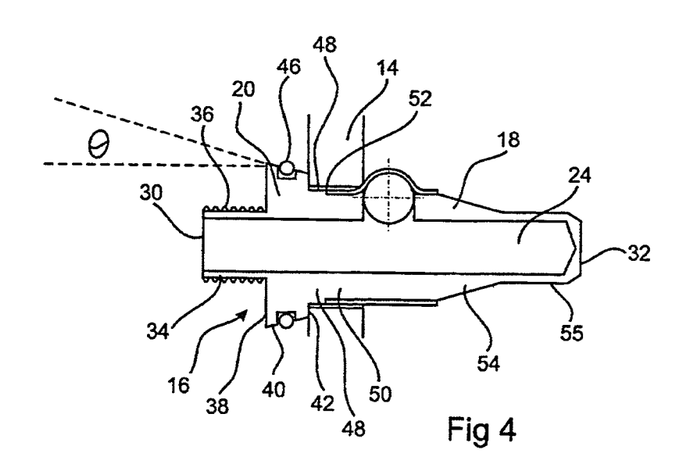
FIG. 4 is a representation of a body of the bolt shown in FIG. 1.

With specific reference to FIG. 4, body 16 has an up hole end 30 and a down hole end 32. Bore 24 is in the form of a blind hole which is open at the up hole end 30 and closed at down hole end 32. A portion 34 of body 16 between up hole end 30 and stop 20 is formed with an external thread 36. In this embodiment stop 20 is formed integrally with shaft 18. Stop 20 has a first radial surface 38 adjacent threaded portion 34, an outer circumferential surface 40, and a second radial surface 42 down hole of the first surface 38. The surface 38 has a greater outer diameter than surface 42. The circumferential surface 40 progressively decreases in outer diameter from surface 38 to surface 42 to form a frusto conical surface. Thus surface 40 slopes or tapers at a first angle θ relative to a longitudinal axis of bore 24. A circumferential groove 44 is formed in surface 40 inboard of surfaces 38 and 42. A resilient O-ring 46 seats in groove 44. In one embodiment O-ring 46 may be made from polyurethane. The O-ring 46 is primarily provided to reduce the effect of vibrations by providing a constant compressive load between the stop 20 and the wear plate 12. An additional but not critical effect of the O-ring 46 is that it may form a seal to prevent ingess of liquid into hole 22. The groove 44 is shown as having a squared U shape in cross section, but other cross sectional shapes including, but not limited, to V shaped or concave with a constant radius are possible.

Down hole of surface 42, the shank 18 is provided with a portion 48 of constant outer diameter that extends for a part of the depth of hole 22. Contiguous with portion 48 is a further portion 50 also of constant outer diameter which is less than the outer diameter of portion 48. The change in diameter between portions 48 and 50 forms a right angle step or shoulder 52 circumferentially about the shaft 18.

Down hole of and contiguous with portion 50 is a portion 54 having a progressively reducing outer diameter. Down hole of and contiguous with portion 54 is a portion 55 of constant outer diameter which terminates at down hole end 32.

A plurality of channels 56, shown most clearly in FIG. 2 is formed in portion 50 of shank 18. Channels 56 are evenly spaced about bore 24 and lie on a common plane. Each channel 56 extends or opens onto the bore 24 at one end, and onto an outer surface of shank 18 at an opposite end. In this particular embodiment, channels 56 have a constant diameter for the entirety of their length.

The locking mechanism 26 is in the form of a plurality of, in particular in this instance three, balls 58, two of which are shown in FIG. 1. Prior to use of fastener 10, corresponding to the pin 28 being in the pre-applied position L1, the balls 58 lie partly within a respective channel 56 and partly within the bore 24. In this configuration, the balls 58 do not extend beyond the outer surface of shaft 18. When the balls are in this configuration, a gap or space is formed between the balls coaxial with the bore 24. A narrowed down hole end 62 of pin 28 sits in this space between the balls 58 when pin 28 is in the pre apply position L1.

Pin 28 is formed with an up hole cylindrical portion 64 which tapers to the down hole end 62. Portion 64 has an outer diameter which is less than the inner diameter of bore 24 to leave a clearance there between. The pin 28 and body 16 are also relatively dimensioned so that when the pin 28 is in the release position L3 an up hole end of pin 28 lies flush with or below a lowest point of the channels 56. In this way, the pin 28 does not apply any lateral force on the balls 58. When in the position L3, the pin 28 is retained within a lower portion of the bore 24 due to its closed down hole end 32.

Prior to placing pin 28 within body 16, a volume of grease or similar viscous hydrophobic lubricant material is deposited in bore 24 typically up to the level of channels 56. As pin 28 is moved from position L1 to L3, this grease or other material is forced to flow back up the bore 24 through the clearance between pin 28 and the inner surface of bore 24, as well as along the channels 56. The flow of the grease or similar material has several benefits including minimising rust and corrosion of fastener 10, and lubricating the nutless bolt 10 to facilitate easy removal.

Bolt 10 is provided with a sleeve 66 which surrounds body 16 and in particular portion 50. Sleeve 66 has an axial length equal to the length of portion 50 and overlies the location where channels 56 open on to the outer surface of body 16. Further, sleeve 66 is formed of a thickness so that when seated against the shoulder 52, the outer circumference of the sleeve 66 is substantially the same as the outer circumference of portion 48. Body 16 is configured so that when sleeve 66 is seated against shoulder shown 52, and the bolt 10 is inserted into hole 22, an up hole portion 68 of sleeve 66 resides in the hole 22.

Sleeve 66 acts to maintain balls 58 partially within their respective channels 56 when pin 28 is in the locking position L2. In this particular embodiment, sleeve 66 is made of a deformable material including but not limited to ductile metals or metal alloys such as aluminium and brass. Sleeve 66 can be interference fit onto the portion 50 or alternately may be provided with a looser fit but attached to the body 16 by crimping.

Bolt 10 is completed by a screw on head 70. Head 70 is of a frusto-conical shape having a tapered circumferential surface 72, planar radial up hole surface, and planar radial down hole surface 76. Circumferential surface 72, tapers at the same angle θ as the surface 40 of stop 20, and lower surface 76 has substantially the same diameter as up hole surface 38 of stop 20. As a consequence, when head 70 is coupled to body 16, the circumferential surfaces 72 and 40 are substantially continuous in slope.

Head 72 has also formed with a central through hole 78 which is coaxial with bore 24. The hole 78 has an up hole portion 80 of a first diameter which extends for about half the depth of hole 78, and a widened down hole portion 82. Down hole portion 82 is formed with an internal screw thread configured to mate with the thread 36 on body 16. The mating of the threads enables head 72 to be screwed on to body 16. Two blind holes 84 are formed in head 70 from surface 74 on diagonally opposite sides of hole 78. Holes 84 enable coupling of head 70 with a pin spanner to facilitate tightening and loosening of head 70.

By forming head 70 separately of body 16, it is possible for the head 70 to be made to make different material and in particular a harder wearing material and body 16. For example, head 70 may be made from made grade 4140 CrMO alloy, where as body 16 may be made from a substantially cheaper material such as high tensile steel. Pin 28 and balls 58 may also be made from materials of sufficient hardness so that when pin 28 is moved from the pre applied position L1 through to the release position L3, the pin 28 and balls 58 are not deformed. Bolt 10 is configured to match hole 22 in that the channels 56 lie beneath and near an underside of structure 14 so that when the bolt 10 is applied by pushing pin 28 to position L2 the balls 58 deform sleeve 66 beneath structure 14 to effectively clamp bolt 10 about opposite sides of hole 22.

The operation of bolt 10 and in particular method of applying and releasing the bolt 10 will now be described.

Body 16, head 70, pin 28, balls 58, and sleeve 66 are separately manufactured from materials such as, not limited, those materials described herein above. During assembly or at least prior to use of bolt 10, body 16 is injected with a volume of grease or other viscous hydrophobic material to the level of between lower and upper levels of channels 56. Balls 58 are then inserted into respective channels 56 from outside of the body 16. Sleeve 66 is pushed onto the portion 50 to a position where it abuts shoulder 52. Sleeve can be held on the body by a light interference fit or crimp, or an easily broken or releasable tape or putty. All that is required here is to hold the sleeve 66 to the body 16 during insertion into the hole 22.

Next pin 28 is pushed into the bore 24 to a position where down hole end 62 is located near or touches the balls 58. This corresponds to pin 28 being in the per-applied position L1.

Assuming wear plate 12 is correctly positioned, body 16 is inserted through a hole 90 in plate 12 so that shaft 18 extends through hole 22 in the underlying structure 14. This insertion may be the way of an application tool which engages the thread 36 on portion 34. The tool (not shown) may take the form for example of a hand held pneumatic gun or electric drill having an internally threaded sleeve for engaging portion 34. The tool is also provided with a ram which is able to apply a force on pin 28 to push the pin 28 in a down hole direction through bore 24 from position L1 to a position L2. When this occurs, the pin 28 forces the balls 58 in a radial outward direction along respective channels 56 deforming the sleeve 66 as shown in FIG. 1.

Even without the head 70, body 16 by itself now acts to hold the plate 16 to the structure 14. Moreover the body 16 clamps the wear plate 16 to the structure 14 by combined action of the stop 20 which bears on a one surface of structure 14, and the balls 58 and deformed sleeve 66 which bear against an opposite side of the structure 14. The O-ring 46 is also now deformed pressing into the groove 44 squashing into any space between outer surface 40 of stop 20 and an inner surface of the hole 90.

As pin 28 is being pushed to positional L2, grease within the bore 24 is caused to flow in an up hold direction as well as a radical outward direction through channels 56. This has the effect of lubricating bolt 10 and applying a hydrophobic layer on components of bolt 10 minimising the risk of corrosion. The application tool used for inserting body 16 into hole 22 and subsequently driving pin 28 from position L1 to L2 is now disengaged from thread 36.

Next, the head 70 is screwed on thread 36 using a pin spanner. The pin spanner may by a manual spanner; an attachment to the same tool used for initially applying the body 16; or, a separate dedicated power tool. Head 70 is configured so that upper surface 74 lies substantially flush with a free surface of wear plate 12 when the bolt 10 is applied. After applying head 70, a settable sealing compound such Silastic™ sealer is injected into hole 78.

Bolt 10 can be subsequently removed using various methods. In a first method, a hammer and punch may be used. Here the punch is located over hole 78 and struck with the hammer to force pin 28 from position L2 to move in a down hole direction to the release position L3. When this occurs, balls 58 are free to roll in a radial inward direction along respective channels 56 so they lie collectively within outer surface of shaft 18. Subsequent, a hand tool can be used to engage bolt 10 and pull it in an upward direct. This will result in the body 16 separating from sleeve 66, thereby allowing bolt 10 to be withdrawn from the hole 22. Sleeve 66 may then fall to the ground. Significantly, during this process, pin 28 is always retained within bolt 10. This assists in improving overall safety associated with the use of bolt 10. While sleeve 66 may fall, the sleeve is generally very light weight and is unlikely to cause any damage or injury.

Figure 5A:
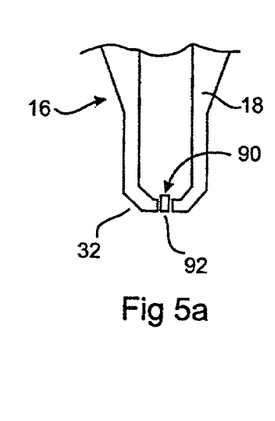
FIG. 5a is a representation of a second embodiment of the bolt.
Figure 5B:
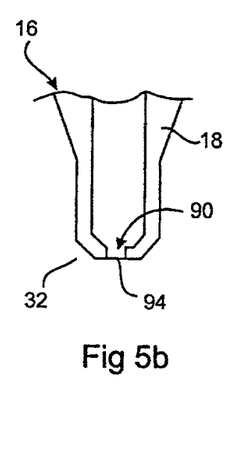
FIG. 5b is a representation of a third embodiment of the bolt.
Figure 5C:
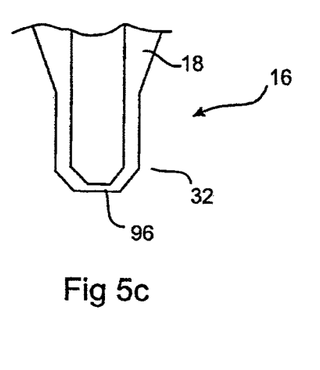
FIG. 5c is a representation of fourth embodiment of the bolt.

Now that an embodiment of the present invention has been described in detailed it will be apparent to those skilled in the art that numerous modifications and variations may be made without departing from the basic inventive concepts. For example, body 16 is described and depicted as having a closed down hole end 32 to retain pin 28 within body 16. However in an alternate embodiments shown in FIGS. 5a and 5b a small diameter hole 90 may be formed in down hole end 32 covered with a frangible seal. The seal may simply be in the form of a reduced thickness wall of body 16 or a wad of settable compound or a frangible or displaceable plug 92 as shown in FIG. 5a. In this instance the wad or plug 92 is penetrated or displaced (i.e. pushed out of the hole 90) by the pin 28. In FIG. 5b the seal is in the form of a reduced thickness wall/foil 94 extending across the hole 90 as shown in FIG. 5b. When pin 28 is moved to the release position L3, down hole end 62 of pin 28 may extend through the hole and break or otherwise deform the seal to provide to a visual indication of the pin being in the release position and thus that fastener 10 is now able to be removed from hole 22. In a further variation shown in FIG. 5c the body is provided with the closed end 32 but the end is formed with a reduced wall thickness 96 which is deformed or ruptured by moving the pin 28 to the release position. However surrounding portions of the wall 96 are thicker and the diameter of wall 96 is less than the maximum diameter of the pin 28. Accordingly, while the pin 28 may rupture the wall 96 the pin 28 is still retained in the body 16. In yet a further variation (not shown) the hole 90 can be left open. Due to the pin 28 having a larger maximum diameter than the hole 90 it is retained in the body 16. However the occurrence of the pin 28 being moved to the release position L3 can be detected by visualisation of the tip 62 through the hole 90. This may be enhanced by painting the tip 62 in a colour that is easily distinguished from the colour of the body 16.

Bolt 10 is not limited to use for the purposes of attaching two components for example a wear plate 12 and structure 14 together. Bolt 10 may also be used as a wall anchor by providing a sleeve similar to sleeve 66 but of a different form which is a preset or cast in the wall. In such a variation, the sleeve is not arranged to deform as in sleeve 66, but rather is provided with recesses which aligned with the passages 56 and balls 58. When the bolt 10 inserted into the sleeve embedded in the wall and the pin 28 moved from the pre applied position L1 to the locking position L2, the balls 58 will lie partially within their respective channels 56 and corresponding recesses formed in the sleeve embedded in the wall. A similar arrangement is described for example, in Applicant's international application of PCT/AU2010/001621 in FIGS. 15a and 15b.

In a further variation a chemical wear sensing system may be incorporated into bolt 10 to provide wear measurement and/or monitoring. The chemical sensing system comprises one or more capsules 100 of a marker chemical held in containers disposed in the head 70 and a sensor 102 capable of detecting the existence of the marker chemical. The marker chemical may be in the form of known inert but distinctive gases. In one example the marker chemical is held in small spheres/capsules (e.g metallic, plastics or ceramic spheres of 2-4 mm diameter) embedded in a resilient plug 104 that is inserted into hole 78 in head 70 and/or bore 24 after the pin 28 has been moved to the locking position L2. The plug is of a diameter larger than the inner diameter of hole 78 to thereby form an interference fit when inserted in hole 78. This provides a sealing effect against ingress of liquid into holes 78 and bore 24. The plug 104 and capsules 100 wear with the wearing of the bolt 10 and wear plate 12. When a wall of a capsule 100 is worn away the marker chemical therein escapes and is subsequently detected by a chemical detector/sensor. By placing the marker chemical capsules/spheres at known depths within hole 78/bore 24 and sensing for the marker chemicals it is possible to monitor wear of the wear plate 12. For example if a marker chemical capsule is held in a plug at a depth of 25 mm from upper surface 74 (and assuming surface 74 is initially flush with the exposed surface of wear plate 12 and the head 70 wears at substantially same rate as wear plate 12) then detection of the marker chemical is indicative of the wear plate wearing 25 mm in thickness.

Two or more plugs may be inserted in a stacked fashion in the hole 78/bore 24 to provide indications of wear at two or more different depths. For example at 25 mm, 40 mm and say 50 mm. In a variation of this concept two or more marker chemical capsules, each capsule bearing a different marker chemical may be embedded at different depths in a single plug inserted into the hole 78/bore 24. Detection of the different chemicals provides an indication of the depth of wear.

When using the chemical wear sensing system the hole 78 and bore 24 may be formed to have the same inner diameter so that a plug that is disposed partially in both forms an interrerence fit in both.

The sensor 102 can be located in the vicinity of the bolt 10 and include a telemetry system to send signals to a control/monitoring station informing of the detection of the marker chemical(s).

All such modifications and variations together with others that will be obvious to persons of ordinary skilled in the art are deemed to be within the scope of the present invention the nature of which is to be determined from to the above description and the appended claims.

The invention claimed is:

1. A nutless bolt comprising:
   a body having a shaft capable of insertion in to a hole and a stop coupled to the body, the stop configured to stop the body falling wholly into or through the hole, the shaft being provided with an axially extending bore, wherein the bore comprises a blind hole which is closed at a down hole end of the shaft and open at an up hole end of the shaft;
   a locking mechanism disposed in the shaft and operable to extend radially from the shaft to lock the body in the hole; and,
   an actuating mechanism disposed in the shaft and being movable axially in the bore in a down hole direction from a preapplied position in which the actuating mechanism does not cause the locking mechanism to extend radially from the shaft, to a locking position where the actuating mechanism causes the locking mechanism to extend radially from the shaft to lock the body in the hole, and subsequently to a release position down hole of the locking position where the actuating mechanism is retained in the body and displaced relative to the locking mechanism to a location enabling the locking mechanism to retract radially into the shaft and the bolt to be withdrawn.

2. The bolt according to claim 1 wherein the bore is configured to prevent the actuating mechanism from falling from the body when moved to the release position.

3. The bolt according to claim 2 wherein the bore is provided at a down hole end of the shaft with an opening of a diameter less than a maximum outer diameter of the actuating mechanism wherein a portion of the actuating mechanism can protrude from the down hole end of the shaft when the locking mechanism is in the release position.

4. The bolt according to claim 3 comprising a frangible seal formed across the opening at the down hole end of the shaft wherein when the actuating mechanism is moved to the release position, the actuating mechanism ruptures the frangible seal.

5. The bolt according to claim 1 wherein the stop is provided with an outer circumferential surface having opposite first and second axial ends wherein the first axial end is located closest the hole when the fastener is inserted into the hole, and wherein the first axial end has a smaller diameter than the second axial end.

6. The bolt according to claim 5 wherein the outer circumferential surface of the stop is generally tapered at a first angle between the first and second axial ends.

7. The bolt according to claim 1 comprising a head engagable with the body.

8. The bolt according to claim 7 wherein the head is provided with a through hole positioned to align axially with the bore in the shaft.

9. The bolt according to claim 7 wherein the outer circumferential surface of the stop is generally tapered at a first angle between the first and second axial ends and wherein the head is provided with an outer circumferential surface which tapers at the first angle.

10. The bolt according to claim 7 wherein the head is formed of a harder wearing material than the body.

11. The bolt according to claim 1 wherein the body is provided with a threaded portion adjacent the stop.

12. The bolt according to claim 11 comprising a head threadingly engagable with the threaded portion of the body.

13. The bolt according to claim 1 comprising a quantity of grease or like material disposed in the shaft in a region between a down hole end of the shaft and the locking mechanism.

14. The bolt according to claim 1 wherein the shaft comprises a plurality of radially extending channels, each channel opening into the bore and onto an outer circumferential surface of the body and configured to allow a portion of the locking mechanism to protrude beyond the outer surface of the shaft when the actuating mechanism is in the locking position.

15. The bolt according to claim 1 wherein the locking mechanism comprises a plurality of balls.

16. The bolt according to claim 1 comprising a sleeve disposed about the body at a location where when the actuating mechanism is in the locked position the locking mechanism is retained between the actuating mechanism and the sleeve and is disposed partly within and partly outside of the body.

17. The bolt according to claim 16 wherein the sleeve has an undeformed state where the sleeve has an outer surface of constant outer diameter and retains the locking mechanism in the body prior to the actuating mechanism being moved to the locking position; and an expanded state where the sleeve is expanded radially outwards by the locking mechanism when the actuating mechanism is moved to the locking position.

18. The bolt according to claim 16 wherein the sleeve is configured such that a portion of the sleeve extends into the hole into which the shaft is inserted, and a portion of the sleeve extends from the hole.

19. The bolt according to claim 16 wherein the shank comprises a first portion adjacent the stop of a first outer diameter, and a second portion contiguous with the first portion having a stepped reduction in outer diameter relative to the first portion, and wherein the shank and the sleeve are relatively configured so that when the sleeve is provided over the second portion of the shank, an outer diameter of the sleeve adjacent the first portion of the shank is substantially the same as the outer diameter of the first portion of the shank.

20. The bolt according to claim 19 comprising chemical wear sensing system arranged to provide wear measurement and/or monitoring of the bolt.

21. The bolt according to claim 20 wherein the chemical wear sensing system comprises:

one or more capsules holdings one or more marker chemicals, the capsules disposed at known locations within the bolt; and, a sensing system capable of detecting the marker chemicals when released from the capsules.

22. A nutless bolt comprising:

a body having a shaft capable of insertion in to a hole and a stop coupled to the body, the stop configured to stop the body falling wholly into or through the hole, the shaft being provided with an axially extending bore the shaft having an up hole end and a down hole end and wherein the bore is open at the up hole end;

a locking mechanism disposed in the shaft and operable to extend radially from the shaft to lock the body in the hole; and, an actuating mechanism configured to enable it to be inserted into the bore from the open up hole and to be moved axially in the bore in a down hole direction from a locking position where the actuating mechanism causes the locking mechanism to extend radially from the shaft to lock the body in the hole, to a release position down hole of the locking position where the actuating mechanism is retained in the body and displaced relative to the locking mechanism to a location enabling the locking mechanism to retract radially into the shaft and the bolt to be withdrawn.

23. The bolt according to claim 22 wherein the bore is configured to prevent the actuating mechanism from falling from the body when moved to the release position.

24. The bolt according to claim 23 wherein the bore is provided at a down hole end of the shaft with an opening of a diameter less than a maximum outer diameter of the actuating mechanism wherein a portion of the actuating mechanism can protrude from the down hole end of the shaft when the locking mechanism is in the release position.

25. The bolt according to claim 24 comprising a frangible seal formed across the opening at the down hole end of the shaft wherein when the actuating mechanism is moved to the release position, the actuating mechanism ruptures the frangible seal.

26. The bolt according to claim 22 wherein the bore comprises a blind hole which is closed at a down hole end of the shaft and open at an up hole end of the shaft.

27. The bolt according to claim 22 wherein the stop is provided with an outer circumferential surface having opposite first and second axial ends wherein the first axial end is located closest the hole when the fastener is inserted into the hole, and wherein the first axial end has a smaller diameter than the second axial end.

28. The bolt according to claim 27 wherein the outer circumferential surface of the stop is generally tapered at a first angle between the first and second axial ends.

29. The bolt according to claim 22 comprising a head engagable with the body.

30. The bolt according to claim 29 wherein the head is provided with a through hole positioned to align axially with the bore in the shaft.

31. The bolt according to claim 29 wherein the outer circumferential surface of the stop is generally tapered at a first angle between the first and second axial ends and wherein the head is provided with an outer circumferential surface which tapers at the first angle.

32. The bolt according to claim 29 wherein the head is formed of a harder wearing material than the body.

33. The bolt according to claim 22 wherein the body is provided with a threaded portion adjacent the stop.

34. The bolt according to claim 33 comprising a head threadingly engagable with the threaded portion of the body.

35. The bolt according to claim 22 comprising a quantity of grease or like material disposed in the shaft in a region between a down hole end of the shaft and the locking mechanism.

36. The bolt according to claim 22 wherein the shaft comprises a plurality of radially extending channels, each channel opening into the bore and onto an outer circumferential surface of the body and configured to allow a portion of the locking mechanism to protrude beyond the outer surface of the shaft when the actuating mechanism is in the locking position.

37. The bolt according to claim 22 wherein the locking mechanism comprises a plurality of balls.

38. The bolt according to claim 22 comprising a sleeve disposed about the body at a location where when the actuating mechanism is in the locked position the locking mechanism is retained between the actuating mechanism and the sleeve and is disposed partly within and partly outside of the body.

39. A nutless bolt comprising:

a body having a shaft capable of insertion in to a hole and a stop coupled to the body, the stop configured to stop the body falling wholly into or through the hole, the shaft being provided with an axially extending bore;

a locking mechanism disposed in the shaft and operable to extend radially from the shaft to lock the body in the hole; and, an actuating mechanism disposed in the shaft and having an up hole end and a down hole end, the actuating mechanism being movable axially in the bore in a down hole direction from a locking position where the actuating mechanism causes the locking mechanism to extend radially from the shaft to lock the body in the hole, to a release position down hole of the locking position where the actuating mechanism is retained in the body and the up hole end of the activating mechanism is advanced past the locking mechanism to a location enabling the locking mechanism to retract radially into the shaft and the bolt to be withdrawn.

40. The bolt according to claim 39 wherein the bore is configured to prevent the actuating mechanism from falling from the body when moved to the release position.

41. The bolt according to claim 40 wherein the bore is provided at a down hole end of the shaft with an opening of a diameter less than a maximum outer diameter of the actuating mechanism wherein a portion of the actuating mechanism can protrude from the down hole end of the shaft when the locking mechanism is in the release position.

42. The bolt according to claim 41 comprising a frangible seal formed across the opening at the down hole end of the shaft wherein when the actuating mechanism is moved to the release position, the actuating mechanism ruptures the frangible seal.

43. The bolt according to claim 39 wherein the bore comprises a blind hole which is closed at a down hole end of the shaft and open at an up hole end of the shaft.

44. The bolt according to claim 39 wherein the stop is provided with an outer circumferential surface having opposite first and second axial ends wherein the first axial end is located closest the hole when the fastener is inserted into the hole, and wherein the first axial end has a smaller diameter than the second axial end.

45. The bolt according to claim 44 wherein the outer circumferential surface of the stop is generally tapered at a first angle between the first and second axial ends.

46. The bolt according to claim 39 comprising a head engagable with the body.

47. The bolt according to claim 46 wherein the head is provided with a through hole positioned to align axially with the bore in the shaft.

48. The bolt according to claim 46 wherein the outer circumferential surface of the stop is generally tapered at a first angle between the first and second axial ends and wherein the head is provided with an outer circumferential surface which tapers at the first angle.

49. The bolt according to claim 46 wherein the head is formed of a harder wearing material than the body.

50. The bolt according to claim 39 wherein the body is provided with a threaded portion adjacent the stop.

51. The bolt according to claim 50 comprising a head threadingly engagable with the threaded portion of the body.

52. The bolt according to claim 39 comprising a quantity of grease or like material disposed in the shaft in a region between a down hole end of the shaft and the locking mechanism.

53. The bolt according to claim 39 wherein the shaft comprises a plurality of radially extending channels, each channel opening into the bore and onto an outer circumferential surface of the body and configured to allow a portion of the locking mechanism to protrude beyond the outer surface of the shaft when the actuating mechanism is in the locking position.

54. The bolt according to claim 39 wherein the locking mechanism comprises a plurality of balls.

55. The bolt according to claim 39 comprising a sleeve disposed about the body at a location where when the actuating mechanism is in the locked position the locking mechanism is retained between the actuating mechanism and the sleeve and is disposed partly within and partly outside of the body.

* * * * *